United States Patent [19]

Azegami et al.

[11] Patent Number: 4,877,687

[45] Date of Patent: Oct. 31, 1989

[54] SYNTHETIC RESIN MOLDED ARTICLE HAVING ANTISTATIC PROPERTY

[75] Inventors: Kiyotaka Azegami, Machida; Suehiro Tayama, Otake; Naoki Yamamoto, Hiroshima; Akira Yanagase; Hiroki Hatakeyama, both of Otaka, all of Japan

[73] Assignee: Mitsubishi Rayon Company, Ltd., Tokyo, Japan

[21] Appl. No.: 95,671

[22] Filed: Sep. 14, 1987

[30] Foreign Application Priority Data

Sep. 16, 1986 [JP] Japan .................. 61-217601

[51] Int. Cl.$^4$ .......................... B32B 27/08; C09K 3/16
[52] U.S. Cl. ........................... 428/520; 428/522; 428/922; 264/266; 526/304; 526/312; 524/913
[58] Field of Search ............... 428/520, 522, 922; 526/320

[56] References Cited

U.S. PATENT DOCUMENTS

| | | | |
|---|---|---|---|
| 3,385,839 | 5/1968 | Honig et al. | 260/80.73 |
| 3,574,158 | 4/1971 | Coleman | 525/217 |
| 3,823,204 | 7/1974 | Okada | 525/212 |
| 3,864,317 | 2/1975 | Ogata et al. | 526/320 |
| 3,868,432 | 2/1975 | Keegan | 523/120 |
| 4,039,634 | 8/1977 | Couchoud | 525/212 |
| 4,299,748 | 11/1981 | Hashizume | 524/519 |
| 4,384,038 | 5/1983 | Ohya | 430/321 |
| 4,526,918 | 7/1985 | Burton | 524/150 |
| 4,734,319 | 3/1988 | Doi et al. | 428/922 |

FOREIGN PATENT DOCUMENTS

| | | |
|---|---|---|
| 45-21892 | 7/1970 | Japan . |
| 47-40313 | 10/1972 | Japan . |
| 52-155191 | 12/1977 | Japan . |
| 59-39736 | 9/1984 | Japan . |

Primary Examiner—P. C. Ives
Attorney, Agent, or Firm—Oblon, Spivak, McClelland, Maier & Neustadt

[57] ABSTRACT

A synthetic resin molded article having good antistatic properties is disclosed, which is composed of a body of a synthetic resin (B) having a surface layer which is predominantly comprised of an antistatic polymer (A) and is integral with the body (B). The antistatic polymer (A) mainly composed of units of a quaternary ammonium base monomer of the formula:

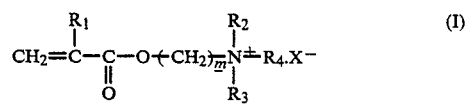

wherein $R_1$ is H or methyl, $R_2$ through $R_4$ are H, unsubstituted or substituted ($C_{1-9}$) alkyl, m is 1–10 and $X^-$ is an anion of a quaternizing agent. The molded article is made by forming a film of the antistatic polymer (A) on the molding surface of a casting mold, casting a polymerizable material to be formed into the synthetic resin (B) as the base material in the casting mold, and polymerizing the polymerizable material to form a body of the synthetic resin (B), simultaneously rendering the film of the polymer (A) integral with the body of the base material.

13 Claims, 1 Drawing Sheet

SYNTHETIC RESIN MOLDED ARTICLE HAVING ANTISTATIC PROPERTY

BACKGROUND OF THE INVENTION

1. Field of the Invention

The present invention relates to a synthetic resin molded article having a good and durable antistatic property and to a process for the preparation thereof.

2. Description of the Related Art

Although many synthetic resin molded articles commercially available at the present have various excellent properties, since they generally have a high electric resistance value, they are easily charged by friction or the like and dust and dirt are readily attracted to the surface thereof to degrade the appearance characteristics.

As means for imparting an antistatic property to a synthetic resin molded article, there can be mentioned (1) an internal addition of a surface active agent; (2) a surface coating with a surface active agent; (3) a surface coating with a silicon compound; and (4) a surface modification by a plasma treatment. Since methods (3) and (4) are expensive, methods (1) and (2) are generally adopted.

In the method of internal addition of a surface active agent, since the surface active agent is incorporated or dispersed into the resin-forming starting material before the polymerization or into a synthetic resin before the molding, the preparation steps can be simplified. However, in order to obtain a desired antistatic property, it is generally necessary to increase the amount of the surface active agent added, and if the amount of the surface active agent is increased, the inherent mechanical characteristics of the synthetic resin are degraded and the obtained antistatic property is readily lost by water washing or friction.

In the method of the surface coating with a surface active agent, the physical properties of a synthetic resin as the base material are not degraded and a satisfactory antistatic property can be obtained with a small amount of the surface agent. However, since the coating step is necessary, the cost is increased and there is a possibility that the inherent beautiful appearance is degraded. Also, the antistatic property is easily lost by water washing or friction.

As is apparent from the foregoing description, a synthetic resin molded article having a good and durable antistatic property and retaining the inherent physical properties of the synthetic resin has not been proposed.

SUMMARY OF THE INVENTION

It is therefore a primary object of the present invention to provide a synthetic resin molded article having a good and durable antistatic property.

In accordance with one aspect of the present invention, there is provided a synthetic resin molded article having an enhanced antistatic property, which comprises a body of a synthetic resin (B) having a surface layer which is predominantly comprised of an antistatic polymer (A) and is integral with the body, said antistatic polymer (A) comprising 20 to 100% by weight of units derived from a monomer having a quaternary ammonium base, which is represented by the following general formula (I):

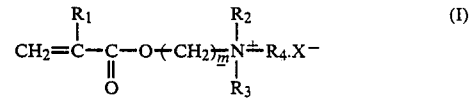

wherein
$R_1$ represents a hydrogen atom or a methyl group,
$R_2$ through $R_4$ represent a hydrogen atom or an alkyl group having 1 to 9 carbon atoms, which may have a substituent,
m is an integer of from 1 to 10, and
$X^-$ is an anion of a quaternizing agent,
and 0 to 80% by weight of units derived from at least one monomer copolymerizable therewith.

In accordance with another aspect of the present invention, there is provided a process for the preparation of a synthetic molded article having an enhanced antistatic property, which comprises forming a film which is predominantly comprised of the above-mentioned antistatic polymer (A) on the molding surface of a casting mold; casting polymerizable material for a synthetic resin (B) as the base material into the mold, polymerizing the polymerizable material to form a body of the synthetic resin (B), simultaneously rendering the film of the antistatic polymer (A) integral with the body of the base material; and subsequently, withdrawing the resulting molded article from the casting mold.

DESCRIPTION OF THE PREFERRED EMBODIMENTS

Figure 1:
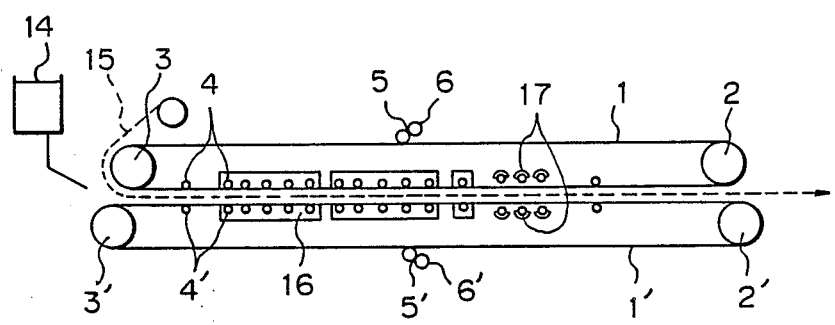
FIG. 1 illustrates an example of an apparatus for the continuous production of a methacrylic resin plate, which is equipped with a device for forming a film of the antistatic polymer (A).

The monomer having a quaternary ammonium base, which is used for the preparation of the antistatic polymer (A) in the present invention, is represented by the following general formula (I):

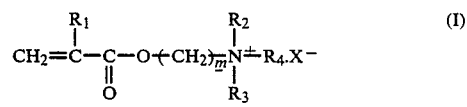

wherein
$R_1$ represents a hydrogen atom or a methyl group,
$R_2$ through $R_4$ represent a hydrogen atom or an alkyl group having 1 to 9 carbon atoms, which may have a substituent,
m is an integer of from 1 to 10, and
$X^-$ is an anion of a quaternizing agent. This monomer is obtained by quaternizing an acrylate or methacrylate having an amino group by a quaternizing agent. As the acrylate or methacrylate having an amino group, there can be mentioned dimethylaminoethyl methacrylate, diethylaminoethyl methacrylate, dimethylaminopropyl methacrylate, dimethylaminoethyl acrylate, diethylaminoethyl acrylate, dimethylaminobutyl methacrylate, dihydroxyethylaminoethyl methacrylate, dipropylaminoethyl methacrylate, and dibutylaminoethyl methacrylate.

As the quaternizing agent, there can be mentioned alkyl sulfates such as dimethyl sulfate, diethyl sulfate, and dipropyl sulfate, sulfonic acid esters such as methyl p-toluenesulfonate and methyl benzenesulfonate, alkyl phosphates such as trimethyl phosphate, alkyl phosphonates such as dimethyl phenylphosphonate, and halides such as alkylbenzyl chloride, benzyl chloride, alkyl chloride, and alkyl bromide. In view of the resistance to thermal decomposition, alkyl sulfates and sulfonic acid esters are especially preferred. In the general formula (I), m is an integer of from 1 to 10, but preferably, m is an integer of from 2 to 6.

As the monomer copolymerizable with the monomer having a quaternary ammonium base, known monomers can be used. For example, there can be mentioned methacrylic acid esters such as methyl methacrylate and ethyl methacrylate, acrylic acid esters such as methyl acrylate and ethyl acrylate, unsaturated carboxylic acids such as acrylic acid and methacrylic acid, acid anhydrides such as maleic anhydride and itaconic anhydride, maleimide derivatives such as N-phenylmaleimide, hydroxyl group-containing monomers such as 2-hydroxyethyl acrylate and 2-hydroxypropyl methacrylate, nitrogen-containing monomers such as acrylamide and acrylonitrile, epoxy group-containing monomers such as allylglycidyl ether and glycidyl acrylate, bifunctional monomers such as allyl methacrylate and allyl acrylate, and macromers such as methacrylate-terminated polymethyl methacrylate, styryl-terminated polymethyl methacrylate, methacrylate-terminated polystyrene, methacrylate-terminated polyethylene glycol and methacrylate-terminated acrylonitrile/styrene copolymer.

In view of the compatibility between the antistatic polymer (A) and the synthetic resin (B) as the base material, preferably the copolymerizable monomer is the same as the monomer to be formed into the synthetic resin (B) or a monomer capable of forming a resin having a good compatibility with the synthetic resin (B).

Preferably a monomer selected from those which are represented by the following formula (II):

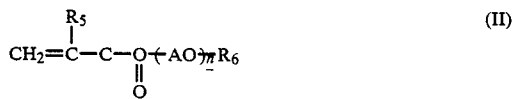

wherein $R_5$ represents a hydrogen atom or a methyl group, $R_6$ represents for an alkyl, allyl, aryl, or aralkyl group having 1 to 18 carbom atoms, A represents an alkylene group having 2 to 4 carbon atoms, and n is an integer of from 0 to 500, is used as the monomer copolymerizable with the monomer having a quaternary ammonium base.

As the monomer of the general formula (II) in which n is 0, there can be mentioned methyl methacrylate, ethyl methacrylate, butyl methacrylate, lauryl methacrylate, ethylhexyl methacrylate, stearyl methacrylate, methyl acrylate, ethyl acrylate, benzyl methacrylate, phenyl methacrylate, cyclohexyl methacrylate, allyl methacrylate and allyl acrylate. In the case where the base synthetic resin (B) is a polymer composed mainly of methyl methacrylate, if a monomer of the general formula (II) in which n is 0 is used, the compatibility between the base synthetic resin (B) and the antistatic polymer (A) is improved, and the film of the antistatic polymer (A) is not left in the casting mold when the molded article is withdrawn from the casting mold, and a good antistatic property can be stably manifested irrespectively of the kind of the casting mold. Especially, when a bifunctional monomer such as allyl methacrylate or allyl acrylate is used, an unreacted double bond can be left in the antistatic polymer (A), and graft polymerization occurs in the polymer (A) when the polymerizable material for the base synthetic resin (B) is polymerized. Therefore, the compatibility between the base synthetic resin (B) and the antistatic polymer (A) is further improved.

As the monomer of the general formula (II) in which n is an integer of from 1 to 500, there can be mentioned polyethylene glycol(4) monomethacrylate, polyethylene glycol(23) monomethacrylate, polyethylene glycol(300) monomethacrylate, polyethylene glycol(23) monoacrylate, polypropylene glycol(23) monomethacrylate, polybutylene glycol(23) monomethacrylate, polyethylene glycol(23) monomethacrylate monomethyl ether, polyethylene glycol(23) monomethacrylate monobutyl ether, polyethylene glycol(23) monomethacrylate monostearyl ether, polyethylene glycol(23) monomethacrylate monophenyl ether, polyethylene glycol(23) monomethacrylate monobenzyl ether, polyethylene glycol(23) monomethacrylate monoallyl ether, and polyethylene glycol(23) monomethacrylate mono-oleyl ether (each numerical value in parenthesis is the number of alkylene oxide units in the polyalkylene glycol moiety).

In the case where the base synthetic resin (B) is a polymer composed mainly of methyl methacrylate, if a monomer of the general formula (II) in which n is an integer of from 1 to 500 is used, the parting property of the obtained synthetic resin molded article from the casting mold, especially the parting property at a high temperature, tends to be improved, and an antistatic synthetic resin molded article can be stably obtained.

The antistatic polymer (A) used in the present invention comprises 20 to 100% by weight of units derived from a monomer having a quaternary ammonium base and 0 to 80% by weight of units derived from a copolymerizable monomer. If the amount of the monomer having a quaternary ammonium base is smaller than 20% by weight, a good antistatic property cannot be imparted to an obtained synthetic resin molded article, for example, a methacrylic resin cast plate. In order to manifest a good antistatic property stably, copolymerization of the monomer having a quaternary ammonium base with a copolymerizable monomer is preferable to homopolymerization of this monomer. A preferred monomer mixture comprises 20 to 90% by weight of a monomer having a quaternary ammonium base and 10 to 80% by weight of a copolymerizable monomer.

Preferably, the antistatic polymer (A) used in the present invention has a molecular weight of at least 1,000. If the molecular weight of the antistatic polymer (A) is lower than 1,000, it often happens that a layer having a good and durable antistatic property cannot be obtained and/or the surface smoothness of the molded article or the releasability of the film from the mold is degraded.

As specific examples of the casting mold used in the present invention, there can be mentioned casting molds formed of inorganic glasses such as tempered glass and metals such as stainless steel, aluminum, and chromium-plated steel. The surface of the glass or metal casting mold is generally a mirror-polished surface, but a mold having a satin-finished surface may be used according to need.

The kind of the base synthetic resin (B) used in the present invention is not particularly critical. However, in the preparation process, the polymerizable material for the base synthetic resin should be used. By the term "polymerizable material" is meant a material capable of changing the polymerization degree and/or other characteristics by polymerization, crosslinking or other reactions. Not only a monomer alone but also a polymer mixture or a polymer/monomer mixture is meant. Namely, any material can be used without any particular limitation, so far as the polymerization degree and/or the characteristics are changed by polymerization, crosslinking or the like during the reaction in the casting mold. For example, there can be mentioned radical-polymerizable monomers such as methyl methacrylate and styrene, mixtures of such monomers with polymers, polyol/polyisocyanate mixtures, mixtures of oligomers having both the ends epoxidized and polyamines or polyamides, unsaturated polyesters, novolak polymer/bisoxazoline mixtures, reactive silicone rubber oligomers and polycarbonate cyclic oligomers.

A methacrylic resin formed from methyl methacrylate, a monomer mixture comprising at least 50% by weight of methyl methacrylate and up to 50% of at least one monomer copolymerizable therewith or a partial polymerization product thereof is most preferred as the base synthetic resin (B) used in the present invention.

As the monomer copolymerizable with methyl methacrylate, there can be mentioned methacrylic acid esters such as ethyl methacrylate, butyl methacrylate, and 2-ethylhexyl methacrylate, acrylic acid esters such as methyl acrylate, ethyl acrylate, butyl acrylate, and 2-ethylhexyl acrylate, unsaturated carboxylic acids such as acrylic acid, methacrylic acid, maleic acid, and itaconic acid, acid anhydrides such maleic anhydride and itaconic anhydride, maleimide derivatives such as N-phenylmaleimide, N-cyclohexylmaleimide, and N-t-butylmaleimide, hydroxyl group-containing monomers such as 2-hydroxyethyl acrylate, 2-hydroxypropyl acrylate, 2-hydroxyethyl methacrylate, and 2-hydroxypropyl methacrylate, nitrogen-containing monomers such as acrylamide, methacrylamide, acrylonitrile, methacrylonitrile, diacetone acrylamide, and dimethylaminoethyl methacrylate, epoxy group-containing monomers such as allyl glycidyl ether, glycidyl acrylate, and glycidyl methacrylate, styrene type monomers such as styrene and α-methylstyrene, crosslinking agents such as ethylene glycol diacrylate, allyl acrylate, ethylene glycol dimethacrylate, allyl methacrylate, divinylbenzene, and trimethylolpropane triacrylate, though monomers that can be used are not limited to those exemplified above.

The kind and amount of the copolymerizable monomer are appropriately selected according to the intended synthetic resin molded article.

Additives may be incorporated into the polymerizable material for the base synthetic resin of the present invention. As the additives, there can be mentioned a colorant, a parting agent, an ultraviolet absorbent, a heat stabilizer, and a filler.

In the present invention, when a film of the antistatic polymer (A) is formed on the surface of the casting mold, a method of coating the mold surface with the antistatic polymer (A) in the form of a solution in water and/or an organic solvent is preferably adopted because the method is simple. Alternatively, a method of coating the mold surface with a mixture of a predominant amount (i.e., at least 50% by weight) of the antistatic polymer (A) and a minor amount (i.e., not more than 50% by weight) of the polymerizable material for the base synthetic resin (B) is preferably adopted. For examples, in the case where the base synthetic resin (B) is a methacrylic resin, the antistatic polymer (A) can be coated on the surface of the casting mold in the form of a mixture thereof with methyl methacrylate, a monomer mixture comprising at least 50% by weight of methyl methacrylate and up to 50% by weight of a copolymerizable monomer, or a partial polymerization product thereof.

A parting agent, a defoaming agent, a levelling agent, a monomer, a crosslinking agent, and the like may be added to the solution or mixture of the antistatic polymer (A), so far as the antistatic property of a film obtained from the solution or mixture, the polymerizability of the polymerizable material for the base synthetic resin, and the physical properties of the base resin are not degraded.

For coating the solution or mixture of the antistatic polymer on the surface of the casting mold, there can be adopted a spray-containing method, a flow-coating method, a bar-coating method, and a dip-coating method.

In the case where a methacrylic resin plate is prepared as the molded article according to the present invention, from the viewpoint of the productivity, preferably a continuous casting method is adopted in which a casting mold comprising two confronting stainless steel belts, each having one surface mirror-polished, and two gaskets is used, which belts and gaskets move in the same direction at the same speed.

In accordance with the present invention, a synthetic resin molded article having a good and durable antistatic property, in which the inherent physical properties of the base synthetic resin are not degraded, can be provided. Therefore, troubles occurring due to accumulation of static charges in application of synthetic resins can be advantageously eliminated.

The surface layer of the molded article, predominantly comprised of the antistatic polymer (A), is integral with the body of the base synthetic resin (B). Therefore, the antistatic property of the molded article is of good durability. When a polymerizable material for the base synthetic resin (B) is cast into a mold, the film of the antistatic polymer (A) formed on the casting surface is swollen with the polymerizable material and, therefore, the film of the antistatic polymer (A) is rendered integral with the body of the base material. The antistatic property is not degraded even when water-washed or rubbed. This is a contrast to the prior art molded article coated with a surface active agent in which the obtained antistatic property is readily lost by water washing or friction.

Furthermore, the antistatic polymer (A) is present only in the surface layer of the molded article of the present invention, a satisfactory antistatic property can be obtained with a small amount of the antistatic polymer (A).

The present invention will now be described in detail with reference to the following examples that by no means limit the scope of the invention.

The electrical properties of all of the samples were determined after moisture conditioning had been carried out at a temperature of 23° C. and a relative humidity of 65% for 1 day. The charge half life was determined under conditions of an applied voltage of 10,000 V, a sample rotation speed of 1,300 rpm, an applied time of 30 seconds, a measurement temperature of 23° C., and a measurement relative humidity of 65% by using a static honesmeter (supplied by Shishido Shokai), and the time required for reduction of the initial sample voltage (i.e., the voltage observed at the time of application of the voltage) to ½ of the application of the voltage was determined as the charge half life (seconds). The surface resistance ($\Omega$) was measured at several points at a measurement temperature of 23° C. and a relative humidity of 65% after passage of 1 minute under application of a voltage of 500 V by a megohm meter (Model TR-8601 supplied by Takeda Riken), and the mean value was calculated. Ordinarily, no substantial scattering of the measured values was observed. Water washing was carried out in warm water maintained at 30° C. for 30 minutes while ultrasonic waves were applied. With respect to the heat resistance, HDT (°C.) was measured according to ASTM D648 after annealing of the sample. With respect to the mechanical strength, the tensile test was carried out according to ASTM D638, and the tensile elastic modulus and tensile strength at break were measured. With respect to the transparency, the haze was measured by using an integrated sphere haze meter (Model SEP-H-SS supplied by Nippon Seimitsu Kogaku).

In the examples, % and parts are by weight unless otherwise specified.

EXAMPLE 1

A 3-liter glass flask equipped with stirring vanes was charged with 374 parts of diethylaminoethyl methacrylate and 450 parts of methanol. A mixture of 252 parts of dimethyl sulfate and 80 parts of methanol was added dropwise with stirring so that the temperature did not exceed 30° C. After completion of the dropwise addition, the mixture was stirred for 30 minutes to obtain a solution (M−1) of a monomer having a quaternary ammonium base.

The solution were added 6 parts of azobisisobutyronitrile, 4 parts of n-octylmercaptan, 480 parts of methanol and 620 parts of polyethylene glycol (23) monomethacrylate monomethyl ether. Polymerization was carried out at 60° C. in a nitrogen atmosphere for 4 hours. After the polymerization, the reaction mixture was vacuum-dried to obtain an antistatic copolymer (P-1).

Then, 5% of the copolymer (P-1) was dissolved in 95% of ethanol to form a film-forming starting material. A stainless steel plate having a length of 600 mm, a width of 450 mm, and a thickness of 3 mm and having one surface mirror-polished was spray-coated on the side of the mirror-polished surface with the so-obtained film-forming starting material, followed by drying. A polymerizable material for a base synthetic resin, formed by dissolving 0.05 part of 2,2'-azobisisobutyronitrile as the polymerization initiator in 100 parts of a partial polymerization product [viscosity=100 cP (the viscosity hereinafter means the value as measured at 20° C.) and conversion=8%] of methyl methacrylate and removing dissolved air under a reduced pressure, was cast in a casting mold constructed by two of the so-treated stainless steel plates and gaskets so that the thickness of the cast product was 3 mm. Polymerization was carried out for 10 hours at 60° C. and for 4 hours at 110° C. Then, the temperature was returned to normal temperature and the case plate was parted from the mold. The surface resistance of the obtained methacrylic resin plate was $1.3 \times 10^9$ $\Omega$, the charge half life was shorter than 1 second, and the haze was 1.2%.

The obtained plate was subjected to a water washing treatment and the antistatic property was evaluated. The surface resistance was $1.8 \times 10^9$ $\Omega$ and the charge half life was shorter than 1 second. A test piece was prepared according to ASTM D648, and HDT was determined after annealing. It was found that HDT was 100° C. When the tensile test was carried out according to ASTM D638, it was found that the tensile elastic modulus was $3 \times 10^4$ kg/cm$^2$ and the tensile strength at break was 760 kg/cm$^2$.

COMPARATIVE EXAMPLE 1

A methacrylic resin plate was prepared in the same manner as described in example 1 except that mirror-polished stainless steel plates not treated with the antistatic polymer were used.

The surface resistance of the obtained plate was larger than $10^{16}$ $\Omega$, the charge half life was longer than 120 seconds, and the haze was 1.0%.

HDT was 100° C., the tensile elaastic modulus was $3 \times 10^4$ kg/cm$^2$, and the tensile strength at break was 760 kg/cm$^2$.

EXAMPLE 2

A methacrylic resin plate having a thickness of 3 mm was prepared in the same manner as described in Example 1 except that tempered glass sheets having a length of 600 mm, a width of 450 mm, and a thickness of 6 mm were used.

The surface resistance of the obtained plate was smaller than $10^9$ $\Omega$, the charge half life was shorter than 1 second, and the haze was 1.2%.

The surface resistance after the water washing treatment was lower than $10^9$ $\Omega$, and the charge half life was shorter than 1 second.

EXAMPLE 3

A methyacrylic resin plate having a thickness of 3 mm was prepared in the same manner as described in Example 1 except that a liquid mixture comprising 2.0% by weight of the copolymer (P-1), 51.0% by weight of methyl methacrylate, and 47.0% by weight of a partial polymerization product (viscosity=100 cP and conversion=8%) of methyl methacrylate was used as the film-forming starting material.

The surface resistance of the obtained plate was $1.5 \times 10^9$ $\Omega$, the charge half life was shorter than 1 second, and the haze was 1.3%.

The surface resistance after the water washing treatment was $2.0 \times 10^9$ $\Omega$, and the charge half life was shorter than 1 second.

EXAMPLES 4 THROUGH 12

Copolymers (P-2) through (P-10) shown in Table 1 were prepared according to the same procedures as described in Example 1 by using the monomer solution (M-1).

Methacrylic resin plates having a thickness of 3 mm were obtained in the same manner as described in Example 1 by using these copolymers.

The results of the evaluation of these plates are shown in Table 1.

EXAMPLES 13 THROUGH 17

Copolymers (P-11) through (P-15) having a quaternary ammonium base were prepared according to the same procedures as described in Example 1 by using a combination, shown in Table 2, of an amino group-containing acrylate or methacrylate with a quaternizing agent.

Methacrylic resin plates having a thickness of 3 mm were obtained in the same manner as described in Example 1 by using these polymers.

The results of the evaluation of these resin plates are shown in Table 3.

EXAMPLE 18

An apparatus for the continuous preparation of a methacrylic resin plate, as shown in the drawing, was used as the casting mold.

Referring to the drawing, belts 1 and 1', which were mirror-polished stainless steel belts having a width of 1.5 m and a thickness of 1 mm, were moved at a speed of 2 m/min by driving a main pulley 2'. The initial tension on the belts was given by a hydraulic press arranged on pulleys 2 and 2' and was set at 10 kg/mm² relatively to the belt section. Each of reference numerals 3 and 3' represents a pulley.

Film-forming starting materials 5 and 5' comprising 2.0% of the copolymer (P-1), 51.0% of methyl methacrylate, and 47.0% of a partial polymerization product of methyl methacrylate (viscosity=100 CP, conversion=8%) were coated on the mirror-polished surfaces of the belts 1 and 1' by roll coaters 6 and 6'.

The so-film-coated belts were caused to confront each other, and both side portions were sealed by tubular gaskets 15 of polyvinyl chloride containing a considerable amount of a plasticizer incorporated therein. A polymerizable material 14 for a base synthetic resin comprising 100 parts by weight of a partial polymerization product (the content of a polymer having an average polymerization degree of 1,800 was 21%) of methyl methacrylate, 0.05 part of 2,2'-azobis(2,4-dimethylvaleronitrile), and 0.01 part of Tinuvin P was supplied through a casting apparatus by a metering pump.

The total length of the polymerization zone was 96 m. In the former area having a length of 66 m, the distance between the belt surfaces was regulated by idle rollers 4 and 4' arranged at intervals of 15 cm. Warm water maintained at 80° C. was sprayed on the outer surfaces of the belts from a nozzle to heat the cast material. In the latter area having a length of 30 m, the belts were supported by idle rollers arranged at intervals of 1 m, and the cast material was heated at about 130° C. by an infrared heater 17 and then cooled. After cooling, the cast material was parted from the belts, and thus, a methacrylic resin plate having a thickness of 3 mm was continuously prepared.

The surface resistance of the obtained resin plate was $1.5 \times 10^9$ Ω, the charge half life was shorter than 1 second, and the haze value was 1.1%.

The surface resistance after the water washing treatment was $1.3 \times 10^9$ Ω, and the charge half life was shorter than 1 second.

EXAMPLE 19

A methacrylic resin plate having a thickness of 3 mm was prepared in the same manner as described in Example 1 except that a film-forming starting material comprising 20% of the copolymer (P-6) and 80% of methyl methacrylate was used.

The surface resistance of the resin plate was $1.3 \times 10^9$ Ω, the charge half life was shorter than 1 second, and the haze was 1.2%.

The surface resistance after the water washing treatment was $1.5 \times 10^9$ Ω, and the charge half life was shorter than 1 second.

COMPARATIVE EXAMPLES 2 AND 3

Copolymers (P-16) and (P-17) shown in Table 1 were prepared according to the same procedures as described in Example 1 by using the monomer solution (M-1).

Methacrylic resin plates having a thickness of 3 mm were prepared in the same manner as described in Example 1 by using these copolymers. The results are shown in Table 1.

TABLE 1

| | Film-forming copolymer | Composition of copolymer | | | | | | Surface resistance (Ω) | Charge half life (sec) | Surface resistance after water washing (Ω) | Haze (%) |
|---|---|---|---|---|---|---|---|---|---|---|---|
| | | Monomer | (%) | Monomer | (%) | Monomer | (%) | | | | |
| Example 4 | P-2 | M-1 | 100 | | | | | $<10^9$ | <1.0 | $<10^9$ | 1.8 |
| Example 5 | P-3 | M-1 | 20 | PEG(23) | 20 | MMA | 60 | $3.6 \times 10^{12}$ | 3.2 | $3.5 \times 10^{12}$ | 1.0 |
| Example 6 | P-4 | M-1 | 25 | PEG(23) | 25 | MMA | 50 | $5.3 \times 10^{10}$ | 2.4 | $4.9 \times 10^{10}$ | 1.1 |
| Example 7 | P-5 | M-1 | 30 | PEG(23) | 30 | MMA | 40 | $8.5 \times 10^9$ | 2.0 | $9.0 \times 10^9$ | 1.2 |
| Example 8 | P-6 | M-1 | 40 | PEG(23) | 40 | MMA | 20 | $3.2 \times 10^9$ | 1.6 | $3.3 \times 10^9$ | 1.4 |
| Example 9 | P-7 | M-1 | 50 | PEG(500) | 50 | | | $1.5 \times 10^9$ | <1.0 | $1.8 \times 10^9$ | 1.2 |
| Example 10 | P-8 | M-1 | 30 | MMA | 70 | | | $1.2 \times 10^{10}$ | 2.0 | $1.3 \times 10^{10}$ | 1.0 |
| Example 11 | P-9 | M-1 | 50 | MMA | 50 | | | $6.7 \times 10^9$ | 2.0 | $7.3 \times 10^9$ | 1.1 |
| Example 12 | P-10* | M-1 | 35 | PEG(23) | 35 | PMMAMA | 30 | $3.4 \times 10^9$ | 1.5 | $3.1 \times 10^9$ | 1.1 |
| Comparative Example 2 | P-16 | M-1 | 10 | PEG(23) | 90 | | | $4.3 \times 10^{14}$ | >120 | $5.2 \times 10^{14}$ | 1.0 |
| Comparative Example 3 | P-17 | M-1 | 10 | PEG(23) | 10 | MMA | 80 | $7.6 \times 10^{14}$ | >120 | $7.9 \times 10^{14}$ | 1.0 |

TABLE 2

| | Amino group-containing acrylate or methacrylate | Quaternizing agent |
|---|---|---|
| Example 13 (P-11) | Diethylaminoethyl methacrylate | Diethyl sulfate |
| Example 14 (P-12) | Diethylaminoethyl methacrylate | Methyl p-toluenesulfonate |
| Example 15 (P-13) | Diethylaminoethyl methacrylate | Methyl chloride |
| Example 16 (P-14) | Dimethylaminoethyl methacrylate | Dimethyl sulfate |
| Example 17 (P-15) | Diethylaminoethyl acrylate | Dimethyl sulfate |

TABLE 3

| | Film-forming copolymer | Surface resistance ($\Omega$) | Charge half life (sec) | Surface resistance after water washing ($\Omega$) | Haze (%) |
|---|---|---|---|---|---|
| Example 13 | P-11 | $2.4 \times 10^9$ | 1.2 | $2.6 \times 10^9$ | 1.3 |
| Example 14 | P-12 | $2.3 \times 10^{10}$ | 2.2 | $2.4 \times 10^{10}$ | 1.2 |
| Example 15 | P-13 | $4.3 \times 10^{10}$ | 2.4 | $4.2 \times 10^{10}$ | 1.5 |
| Example 16 | P-14 | $1.1 \times 10^9$ | <1.0 | $1.0 \times 10^9$ | 1.1 |
| Example 17 | P-15 | $2.3 \times 10^9$ | 1.1 | $2.5 \times 10^9$ | 1.1 |

EXAMPLE 20

A methacrylic resin plate having a thickness of 3 mm was prepared in the same manner as described in Example 4 except that mirror-polished tempered glass sheets having a length of 600 mm, a width of 450 mm, and a thickness of 6 mm were used for the polymerization casting mold.

The surface resistance of the obtained resin plate was lower than $10^9\ \Omega$ at most of the measurement points, but the surface resistance exceeded $10^{16}\ \Omega$ at some measurement points.

From the foregoing results, it is seen that under special casting mold conditions, use of an antistatic polymer (A) comprising a comonomer component in addition to a monomer having a quaternary ammonium base is advantageous for manifesting a good antistatic effect stably.

EXAMPLE 21

A resin plate obtained by carrying out the polymerization in the same manner as described in Example 1 was parted from the casting mold at 100° C. Parting could be performed without any particular trouble. The surface resistance of the obtained methacrylic resin plate was $2.4 \times 10^9\ \Omega$.

EXAMPLE 22

Parting of a resin plate obtained in the same manner as described in Example 11 from the casting mold at 100° C. was tried, but parting was impossible. When the mold was cooled to 60° C., parting became possible. The surface resistance of the obtained methacrylic resin plate was $7.2 \times 10^9\ \Omega$.

From the results obtained in Examples 21 and 22, it is understood that if a monomer of the general formula (II) in which n is an integer of from 1 to 500 is used as the comonomer of the antistatic copolymer (A), the parting property at a high temperature is improved.

COMPARATIVE EXAMPLE 4

A methacrylic resin plate having a thickness of 3 mm was prepared in the same manner as described in Example 1, except that a 10% solution of a coating type antistatic agent having a quaternary ammonium base (Staticide supplied by Analytical Chemical Laboratories) in isopropyl alcohol was used as the film-forming starting material.

The surface resistance of the obtained resin plate was $1.6 \times 10^9\ \Omega$, the charge half life was shorter than 1 second, and the antistatic property was good. However, many rough areas were formed on the surface of the resin plate because of partial peeling from the surface of the casting mold during the polymerization, so the resin plate had no commercial value.

We claim:

1. A synthetic resin molded article having good antistatic properties, which comprises a body of a synthetic resin (B) having a surface layer which is predominantly comprised of an antistatic polymer (A) and is integral with the body, said antistatic polymer (A) comprising:
   20 to 100% by weight of units derived from a monomer having a quaternary ammonium base, and represented by the following general formula (I):

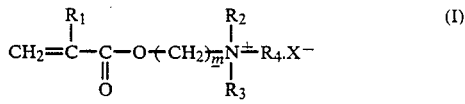

wherein
   $R_1$ represents a hydrogen atom or a methyl group,
   $R_2$ through $R_4$ independently represent a hydrogen atom or an alkyl group having 1 to 9 carbon atoms, which may have a substituent,
   m is an integer of from 1 to 10, and
   $X^-$ is an anion of a quaternizing agent, and
   0 to 80% by weight of units derived from at least one monomer copolymerizable therewith,
   wherein said synthetic resin molded article is obtained by forming a film of the antistatic polymer (A) on the molding surface of a casting mold, casting a polymerizable material to be formed into the synthetic resin (B) as the base material in the casting mold, and polymerizing the polymerizable material to form a body of the synthetic resin (B) simultaneously rendering the film of the antistatic polymer (A) integral with the body of the base material.

2. The synthetic resin of claim 1, wherein said antistatic polymer (A) is obtained by quaternizing a (meth)acrylate having an amino group by a quaternizing agent, wherein said (meth)acrylate having an amino group is one member selected from the group consisting of dimethylaminoethyl methacrylate, dimethylaminoethyl methacrylate, dimethylaminopropyl methacrylate, dimethylaminoethyl acrylate, diethylaminoethyl acrylate, dimethylaminobutyl methacrylate, dihydroxyethylaminoethyl methacrylate, dipropylaminoethyl methacrylate, and dibutylaminoethyl methacrylate; and wherein said quaternizing agent is at least one member selected from the group consisting of alkyl sulfates, sulfonic acid esters, alkyl phosphates, alkylbenzyl chlorides, benzyl chlorides, alkyl chlorides, and alkyl bromides.

3. The synthetic resin molded article of claim 2, wherein said quaternizing agent is dimethyl sulfate, diethyl sulfate, dipropyl sulfate, methyl p-toluenesulfonate, methylbenzene sulfonate, trimethylphosphate, or dimethyl phenylphosphonate.

4. The synthetic resin molded article of claim 1, wherein m is an integer of from 2 to 6.

5. The synthetic resin molded article of claim 1, wherein said monomer copolymerizable therewith is at least one member selected from the group consisting of methacrylic acid esters, acrylic acid esters, unsaturated carboxylic acids, acid anhydrides, maleimide derivatives, hydroxyl group-containing monomers, nitrogen-containing monomers, epoxy group-containing monomers, bifunctional monomers, and macromers.

6. A synthetic resin molded article as set forth in claim 1, wherein the antistatic polymer (A) comprises 20 to 90% by weight of units derived from the monomer having a quaternary ammonium base, which is represented by the general formula (I), and 10 to 80% by weight of at least one monomer copolymerizable therewith.

7. A synthetic resin molded article as set forth in claim 1, wherein the units derived from the copolymerizable monomer in the antistatic polymer (A) are the same as the units derived from the monomer to be formed into the synthetic resin (B) as the base material or are units of a monomer capable of forming a resin having a good compatibility with the synthetic resin (B) as the base material.

8. A synthetic resin molded article as set forth in claim 1, wherein the synthetic resin (B) as the base material comprises 50 to 100% by weight of units derived from methyl methacrylate and 0 to 50% by weight of units derived from at least one monomer copolymerizable therewith.

9. A synthetic resin molded article as set forth in claim 1, wherein the monomer copolymerizable with the monomer having a quaternary ammonium base is represented by the following general formula (II):

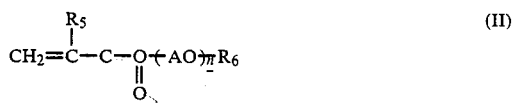

wherein
$R_5$ represnets a hydrogen atom or a methyl group,
$R_6$ represents a hydrogen atom or an alkyl, allyl, aryl, or aralkyl group having 1 to 18 carbon atoms,
A represents an alkylene group having 2 to 4 carbon atoms, and
n is an integer of from 0 to 500.

10. A synthetic resin molded article as set forth in claim 9, wherein n in the general formula (II) is 0.

11. A synthetic resin moled article as set forth in claim 9, wherein n in the general formula (II) is an integer of from 1 to 500.

12. A synthetic resin molded article as set forth in claim 1, wherein the counter anion $X^-$ of the quaternary ammonium base is represented by the following general formula:

$R_7SO_3^-$ or $R_7OSO_3^-$ wherein
$R_7$ represents a hydrogen atom or an alkyl group having 1 to 20 carbon atoms, which may contain a phenyl group.

13. A synthetic resin molded article as set forth in claim 1, wherein the average molecular weight of the antistatic polymer (A) is at least 1,000.

* * * * *